(12) United States Patent
van Zwol

(10) Patent No.: US 10,013,704 B2
(45) Date of Patent: *Jul. 3, 2018

(54) INTEGRATING SPONSORED MEDIA WITH USER-GENERATED CONTENT

(71) Applicant: Excalibur IP, LLC, New York, NY (US)

(72) Inventor: Roelof van Zwol, Barcelona (ES)

(73) Assignee: Excalibur IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,704

(22) Filed: Jun. 9, 2016

(65) Prior Publication Data

US 2016/0292725 A1   Oct. 6, 2016

Related U.S. Application Data

(63) Continuation of application No. 14/101,752, filed on Dec. 10, 2013, now Pat. No. 9,436,950, which is a continuation of application No. 11/846,786, filed on Aug. 29, 2007, now Pat. No. 8,639,714.

(51) Int. Cl.
| | |
|---|---|
| *G06F 17/30* | (2006.01) |
| *G06Q 30/02* | (2012.01) |
| *H04L 29/06* | (2006.01) |
| *G06F 3/0481* | (2013.01) |
| *G06F 17/21* | (2006.01) |

(52) U.S. Cl.
CPC ....... *G06Q 30/0251* (2013.01); *G06F 3/0481* (2013.01); *G06F 17/211* (2013.01); *G06F 17/30056* (2013.01); *H04L 65/602* (2013.01); *H04L 65/607* (2013.01)

(58) Field of Classification Search
CPC combination set(s) only.
See application file for complete search history.

(56) References Cited

U.S. PATENT DOCUMENTS

| | | | |
|---|---|---|---|
| 5,647,002 A | 7/1997 | Brunson | |
| 7,698,331 B2 * | 4/2010 | Carson, Jr. | G06Q 30/02 707/728 |
| 2002/0033844 A1 | 3/2002 | Levy et al. | |

(Continued)

FOREIGN PATENT DOCUMENTS

| | | |
|---|---|---|
| KR | 10-2006-0065922 | 6/2000 |
| KR | 10-2004-0104060 | 12/2004 |
| WO | WO 2007/002277 A2 | 1/2007 |

OTHER PUBLICATIONS

Written Opinion of the International Searching Authority for related foreign application PCT/US2008/071503.

(Continued)

*Primary Examiner* — Shyue Jiunn Hwa
(74) *Attorney, Agent, or Firm* — Brinks Gilson & Lione

(57) ABSTRACT

A variety of computer based service that permit users to edit, compose, upload, or otherwise generate content also provide for the integration of sponsored media into presentations along with user-generated content. An exemplary service generates text based on user input, provides tags based on the text to a sponsored media repository, receives a sponsored media data structure in return, and formats sponsored media from the data structure for display to the user.

19 Claims, 5 Drawing Sheets

(56) References Cited

U.S. PATENT DOCUMENTS

| | | | |
|---|---|---|---|
| 2004/0083133 A1* | 4/2004 | Nicholas | G06Q 30/02 705/14.52 |
| 2004/0088328 A1* | 5/2004 | Cook | G06F 17/30038 |
| 2006/0015904 A1 | 1/2006 | Marcus | |
| 2006/0053470 A1* | 3/2006 | Colter | G06F 17/2247 725/135 |
| 2006/0236243 A1 | 10/2006 | Brain et al. | |
| 2007/0038567 A1 | 2/2007 | Allaire et al. | |
| 2007/0038931 A1 | 2/2007 | Allaire et al. | |
| 2007/0061197 A1* | 3/2007 | Ramer | G06Q 30/02 705/14.64 |
| 2007/0112630 A1 | 5/2007 | Lau et al. | |
| 2007/0150368 A1 | 6/2007 | Arora et al. | |
| 2007/0162432 A1 | 7/2007 | Armstrong et al. | |
| 2008/0033744 A1* | 2/2008 | Jones | G06Q 30/02 705/329 |
| 2008/0071929 A1 | 3/2008 | Motte et al. | |
| 2008/0189099 A1 | 8/2008 | Friedman et al. | |
| 2008/0244038 A1 | 10/2008 | Martinez | |
| 2008/0301093 A1* | 12/2008 | Haugen | G06Q 30/02 |
| 2008/0313036 A1* | 12/2008 | Mosko | G06Q 20/10 705/14.41 |
| 2009/0006192 A1* | 1/2009 | Martinez | G06Q 30/02 705/14.69 |
| 2009/0125609 A1 | 5/2009 | Wood et al. | |
| 2010/0293221 A1* | 11/2010 | Sidman | G06F 17/30855 709/203 |

OTHER PUBLICATIONS

International Search Report for related foreign application PCT/US2008/071503.

* cited by examiner

INTEGRATING SPONSORED MEDIA WITH USER-GENERATED CONTENT

RELATED APPLICATIONS

The present patent document is a continuation of application Ser. No. 14/101,752, filed Dec. 10, 2013, which is a continuation of Ser. No. 11/846,786, filed Aug. 29, 2007, which are hereby incorporated by reference.

BACKGROUND OF THE INVENTION

Field of Invention

The present invention is directed toward Web site content, and more particularly towards integrating and remixing sponsored media with user-generated content.

Art Background

Many online services permit users to generate content, and to include linked, embedded, or uploaded content within the content they generate. For example, online video editing services, such as Jumpcut, allow users to upload, edit, and remix their home video, and to share it with friends on the Internet. Blogging tools, e.g. Yahoo! 360, permit users to share their experiences, thoughts, or proposals by maintaining a web log or blog.

In authoring a blog, many users take advantage of the digital medium by adding media including images, video and audio to the web page. Similarly, users of video editing services are often concerned with supplementing their own video with images or video clips illustrating events or ideas that their video doesn't fully elucidate. Though some video services make other user-generated content available for integration into user creations, this content is unlikely to serve user desires. For instance, much user-generated content is low quality due to lack of professional production equipment or limited access to upload bandwidth. Further access to other user's content rarely solves an authors quest for certain types of media, simply because other users share the author's problem, e.g. lack access to copyrighted events or high-capital image or video acquisition techniques.

To remedy these problems users of blogging tools and video editing services often search for images or video online and included results of their liking in their blogs or videos without much concern for copyright issues. This presents a problem for publishers, as it can incur liability.

In addition, publishers, including Yahoo!, that attempt to monetize traffic must present content viewers with ads sufficiently interesting to those viewers that they click through to the advertiser page, or perform some other conversion event. A classic strategy to achieve such interests is to present ads related to the content presented on the page. However, current content match solutions are imperfect, especially in the video, audio, and image contexts.

SUMMARY OF THE INVENTION

Embodiments of this invention enable the integration of high-quality sponsored media with the content of web-users when authoring an on-line experience.

In one aspect, some embodiments of the present invention relate to computer-implemented methods. For example, a computer-implemented method consistent with some embodiments of the invention comprises steps of extracting a set of keywords based on input from a user, wherein the set of keywords are associated with user-generated content. Then, providing keywords from the set of tags as part of a call, receiving a sponsored media data structure based on the keywords in return to the call, and formatting the sponsored media data structure to fit in a media selection module. Preferably the media selection module permits the user to select sponsored media for integration into a presentation along with the user-generated content In some embodiments the step of extracting a set of keywords based on input from a user is performed following user-initiation of an original content upload. In some embodiments the input from the user is a text list of tags describing the original content. In some embodiments the user-generated content is a still image. In some embodiments the user-generated content is a video. In some embodiments the step of extracting a set of keywords based on input from a user is performed during text composition by the user In some embodiments a content generation client and a content matching module together implement a computer-implemented method consistent with the present invention. For example, a content generation client embodied on a web page and a content matching module embodied in a server-side script on a web server can together implement a method consistent with the present invention. In one such embodiment, the content generation client is a web-based client that comprises the media selection module referred to above. Preferably the content generation client performs the step of extracting. The content matching module preferably performs the steps of providing, receiving and formatting. Preferably the keywords are provided to, and the sponsored media data structure received from, a sponsored media repository.

Following a user's generation of the presentation, it can be viewed by both the author and by other users. The presentation is displayed to a user of a presentation client. During display, the presentation client retrieves the portions of the presentation comprising sponsored media data structure from tile sponsored media repository.

In another aspect, embodiments of the present invention relate to content generation clients. For example, a content generation client consistent with some embodiments of the invention comprises an information extraction module and a media presentation module.

The information extraction (IE) module is configured to perform several tasks based on user input. The IE module extracts a set of keywords based on input from the user. It then provides the set of keywords as part of a call. The content generation client expects to receive a formatted sponsored media data structure based on the set of keywords in return to the call.

The sponsored media selection module is configured to receive the formatted media from the media data structure and to display the formatted sponsored media. In such embodiments, the sponsored media selection module preferably integrates sponsored media selected by the user to select sponsored media into a presentation comprising user-generated content, wherein the sponsored media comes from a sponsored media repository A presentation produced by a user of the content generation client is preferably displayed through a presentation client. The presentation client retrieves those portions of the presentation comprising sponsored media data structure from the sponsored media repository.

In yet another aspect of the present invention, embodiments relate to a content matching server. For example, a content matching server comprises a content matching module and a sponsored media repository. The content matching module is configured to receive a set of keywords from a content generation client. The CM module provides keywords based on the set of keywords as part of a call to a sponsored media repository.

The sponsored media repository is configured to receive the keywords and to provide a sponsored media data structure based on the keywords to the CM module. The CM module is further configured to format sponsored media from the sponsored media data structure to fit in a media selection module and to provide the formatted sponsored media to the media selection module.

In still another aspect, consistent with some embodiments, is a system for providing a web-based service to permit integration of user-generated content with sponsored media. An example is a system comprising a content generation client, a content matching module, and a sponsored media repository.

The content generation client is configured to generate a set of keywords based on user input and associated with user-generated content and to provide the set of keywords to a content matching module.

The CM module is configured to provide keywords from the set of keywords as part of a call to the sponsored media repository.

The sponsored media repository is configured to receive the keywords and, based on the keywords, to provide a sponsored media data structure to the CM module, which is further configured to format sponsored media from the sponsored media data structure to fit in a media selection module of the content generation client. The media selection module permits selected media to be integrated into a presentation that also comprises the user-generated content.

DETAILED DESCRIPTION

This disclosure sets forth a model for integrating and remixing sponsored media with user-generated content.

As used herein, "content generation" refers to any of several modes of use of certain embodiments of the present invention during which a user produces user generated content, or integrates sponsored media with user generated content; these include authoring, editing, mixing, and remixing. "Presentation" refers to the product any of several modes of use of certain embodiments of the present invention. "Sponsored media" refers to media provided by an advertiser to a provider of a content generation service for integration into presentations that also include user-generated content. "User-generated content (UGC)" refers to various kinds of media content that are produced or primarily influenced by end-users, as opposed to traditional media producers, licensed broadcasters and production companies.

Architecture

Figure 1:
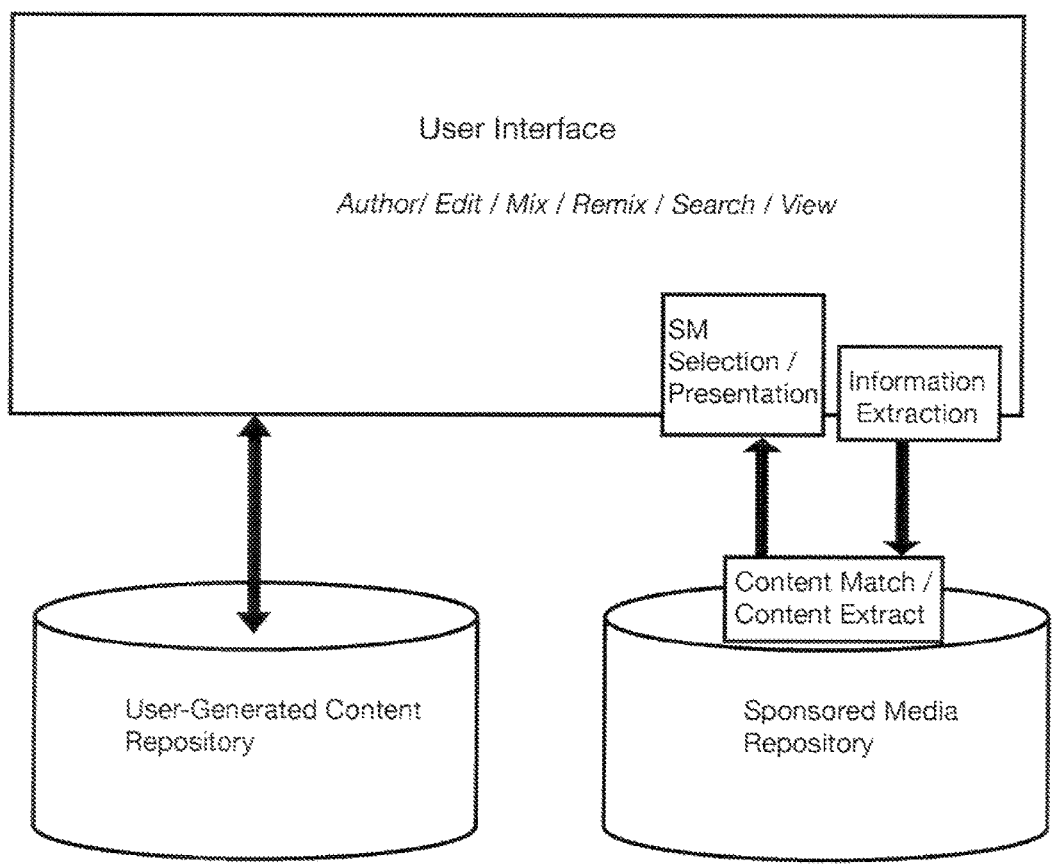
FIG. 1 illustrates the high level architecture of a computer-implemented service consistent with some embodiments of the present invention.

FIG. 1 illustrates a general architecture consistent with some embodiments of the present invention. As shown, such embodiments comprise a User Interface (UI) including an Information Extraction (IE) and Sponsored Media Selection (SMS) or Sponsored Media Presentation (SMP) modules, a Sponsored Media (SM) Repository including a Content Match (CM) and Content Extract (CE) module and a User-Generated Content (UGC) Repository.

The UT communicates with the SM repository. Preferably, as shown, this communication takes place between the IE and SMS/SMP modules of the UT and the CM/CE modules of the SM repository. Preferably, signals sent by the CM module to the SMS module are based on calls sent to the CM module by the IE module. Similarly, signals sent by the CE module to the SMP module are preferably based on calls sent the CE module by the IE module.

The UI also communicates with the UGC repository. Preferably this communication takes place directly from the UI, which both sends signals to and receives signals from the UGC repository.

The UI permits a user interacting with such embodiments to perform one or more functions related to user-generated content and preferably also to sponsored media. These functions preferably include several functions that operate on user-generated content: authoring or composition, editing, remixing, searching, and viewing of content from the UGC repository.

The remixing and viewing functions preferably operate on sponsored media and the searching function on the SM repository. In addition, the editing function preferably operates on sponsored media, though in some embodiments editing of sponsored media is limited, in part or in whole. Furthermore, the remixing and editing functions, along with the overall architecture shown, permit integration of sponsored media with user-generated content. In addition, the viewing function, when operated over both the UCG and SM repositories, and with the SMP module, permits the viewing of presentations integrating both user-generated content and sponsored media. Preferably users or groups of users, including the public, selected by the author of such presentations are permitted to view such presentations.

During authoring or composition, editing, and remixing functions, information extracted from a user's content choice or entry by the IE module is sent to the CM module. The CM module retrieves-sponsored media from the SM repository based on the information received and sends the retrieved media to the SMS module of the UI. The SMS module displays the sponsored media to the user and permits the user to integrate the displayed sponsored media into the presentation being authored or composed, edited, or remixed. Preferably the sponsored media presented to the user is selected based on its relatedness to the user-generated content being authored, edited, remixed, or otherwise composed within the UI.

During the searching function, information extracted from a user's search entry by the IE module is sent to the CM module. The CM module retrieves sponsored media from the SM repository based on the information received and sends the retrieved media to the SMS module of the UI. The SMS module displays the sponsored media to the user and permits the user to integrate the displayed sponsored media into a presentation. Preferably the sponsored media presented is preferably selected based on the explicit search.

During viewing functions, sponsored media selected by the author of a presentation has been integrated into the presentation and is displayed to a viewer in the context of the presentation. Preferably, the IE module retrieves information relating to the included sponsored media from the presentation and provides that information to the CE module. The CE module retrieves the included media from the SM repository and provides it to the SMP module of the UI. Preferably during viewing the sponsored media and user-generated content that make up the presentation are seamlessly integrated into the viewed presentation but each retrieved separately from their respective repositories.

Content Generation

Figure 2:
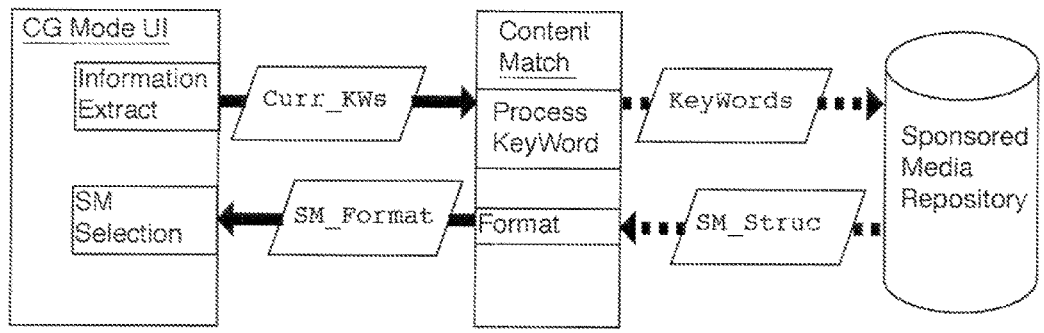
FIG. 2 illustrates an interaction between a user interface and a sponsored media repository during and edit mode consistent with some embodiments of the present invention.

FIG. 2 illustrates exemplary flow of signals during content generating modes consistent with some embodiments of the present invention. For clarity, we refer to a user that interacts with the content-generating mode as "author". The signal flow occurs over several steps that are sequential in time, but need not be contiguous. FIG. 2 shows a user interface (UI) of a content generation (CG) mode consistent with some embodiments of the present invention. The CG mode UI is shown interacting with a Content Match (CM) module and therethrough with a Sponsored Media (SM) repository. Preferably the CM module is integrated with the SM repository, for example in a server-side script on a data server that forms part of the SM repository. In some embodiments the CM module is implemented in a server-side script on the server that provides a web page that forms part of the CG mode UI.

First, user interaction with the UI generates information. This information takes many forms within various embodiments of the present invention. For example, in some embodiments an author composing a text entry in a blog or form of online text-based content generates the information. In some embodiments, an author prompted by the UI enters tags or keywords describing an uploaded piece of visual content, e.g. a photo, a video clip, or a set thereof, and this serves to generate the information. In some embodiments, an author chooses user-generated content from a repository for use in generating new content. Typically the chosen content will have been uploaded during some previous session and perhaps by some other user. In this type of situation, by choosing content the author triggers information generation; the information is based on tags or keywords associated with the chosen content.

The Information Extract (IE) module extracts the current information generated via user interaction and transforms it into a set of keywords. Then, the keywords or some portion thereof are passed to the CM module. In the illustrated embodiment, the set of keywords, labeled Curr_KWs, is passed to a KeyWord processing subroutine of the CM module. Passage of Curr_KWs is preferably passive on the part of the UI, i.e. initiated and performed by the IE module.

The processing subroutine composes a set of keywords, Curr_KW, from Curr_KWs. In some embodiments KeyWords is identical to Curr_KWs. However, in some embodiments the CM module remembers previous sets of keywords and composes a set KeyWords based in part on previous keywords. In any case, Keywords is used as part of a call to the SM repository. Preferably the call that sends Keywords to the SM repository is asynchronous from the standpoint of the CG mode UI. For example, in some embodiments the call is an asynchronous POST call initiated by a JavaScript routine that expects a response in Extensible Markup Language (XML). This type of call is also known as an AJAX POST call. The prefer-red asynchronicity of the call is shown in the figure via dashed lines.

In response to the Keywords call, the SM repository responds with a sponsored media data structure, here denoted SM_Struc. The response is directed to a formatting subroutine of the CM module. Preferably the sponsored media data structure is provided in a standard format for structured data, e.g. XML. Further, the response SM_Struc is preferably asynchronous with respect to the CG mode UI. In the figure this asynchronicity is represented via dashed lines. The sponsored media data structure SM_Struc includes a set of sponsored media that matches KeyWords. In some embodiments SM_Struc further includes additional information about each piece of sponsored media, e.g. its title, credit, description.

The formatting subroutine converts the data structure into a format readable by a media display module of the CG mode UI. As illustrated, the subroutine passes SM_Format to the display module of the UI. Preferably the CM module formats an data structure SM_Struc into a format suitable for the display module via an embedded routine, e.g. for XML an embedded extensible stylesheet language (XSL) routine. For example, in some embodiments the embedded routine is an XSL transformations XSLT routine; however some embodiments use other formatting techniques, e.g. XSL formatting objects, XML Path Language, or some other technique. Furthermore, in embodiments where the data structure passed from the SM repository is in non-XML format, some suitable formatting technique is used.

The media display module of the CG mode UI permits the author to view and select media displayed therein. In some embodiments, including the illustrated embodiment, the display module receives a set of sponsored media from the SM repository via the CM module. Preferably the display module shows the author a subset of the media included in SM_Struc at one time. Most preferably the display module permits the author to browse a larger subset of SM_Struc.

Further, the CG mode UI permits the author to select media displayed therein. In some embodiments when a piece of media is selected, the author is presented with additional information relating to that piece of media. In some embodiments the author is permitted to view the piece of media. Also, the author is preferably permitted to integrate the selected piece of media into the presentation the author is generating. A generated presentation is preferably stored as a data structure that includes identifiers of both sponsored media and user-generated content included in the presentation. In some embodiments the user-generated content is included directly in the presentation.

Once the author has generated a presentation. The author or other users or groups of users so permitted by the author can view that presentation. Viewing occurs in the Presentation mode UI.

Presentation Mode

Figure 3:
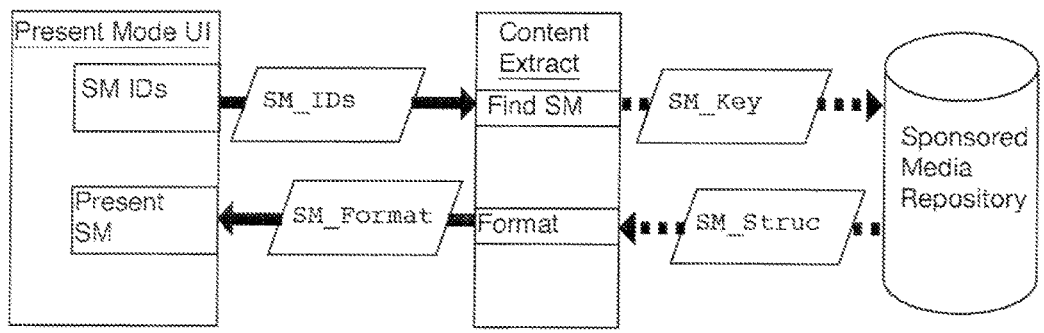
FIG. 3 illustrates an interaction between a user interface and a sponsored media repository during and presentation mode consistent with some embodiments of the present invention.

FIG. 3 illustrates exemplary flow of signals during presentation modes consistent with some embodiments of the present invention. For clarity, we refer to a user that interacts with the content-generating mode as "viewer". The signal flow occurs over several steps that are sequential in time, but need not be contiguous. FIG. 3 shows a user interface (UI) of a presentation (P) mode consistent with some embodiments of the present invention. The P mode UI is shown interacting with a Content Extract (CE) module and therethrough with a Sponsored Media (SM) repository, Preferably the CE module is separate from the P mode UI, for example in a server-side script on the server that provides a web page that forms part of the P mode UI. In some embodiments the CE module is integrated with the SM repository, e.g. as a server-side script on a data server that forms part of the repository. FIG. 3 illustrates only the retrieval and presentation of the sponsored media portions of the presentation. Though the presentation is preferably seamless as presented to the viewer, the sponsored media within the presentation preferably is retrieved at viewing time from the SM repository. The user-generated content can be retrieved from the UGC repository at view time or can be integrated into the data structure underlying the presentation.

First, sponsored media identifiers, SM_IDs, are extracted from the presentation's underlying data structure by the CE module. The identifiers are preferably associated with the sponsored media both in the SM repository and throughout the content generation process shown in FIG. 2. Passage of SM_IDs is preferably passive on the part of the UI, i.e. initiated and performed by the CE module. The form of the identifiers in the presentation data structure varies according to the type of media involved. For example, in the case of sponsored media images the identifiers can be embedded in <div> tags, for video or audio the identifiers can be listed in an XML schema that also includes the user-generated portions of the presentation.

Then, in the illustrated embodiment, a subroutine of the CE module passes an identifier or set of identifiers, SM_Key, to the SM repository for each piece of sponsored media. In some embodiments this task is trivial and SM_Key is identical to SM_IDs. In other embodiments individual identifiers are extracted from SM_IDs and passed each as SM_Key to the SM repository. For example, if the presentation is video and is presented to the viewer in a stream, the CE module could retrieve media positioned earlier in the video first and later-positioned media thereafter.

The call of the CE module to the SM repository is preferably asynchronous from the standpoint of the P mode UI. For example, in some embodiments the call is an asynchronous POST call initiated by a JavaScript routine that expects a response in Extensible Markup Language (XML). This type of call is also known as an AJAX POST call. The preferred asynchronicity of the call is shown in the figure via dashed lines.

In response to the SM_Key call, the SM repository responds with a sponsored media data structure, here denoted SM_Struc. The response is directed to a formatting subroutine of the CE module. Preferably the sponsored media data structure is provided in a standard format for structured data, e.g. XML. Further, the response SM_Struc is preferably asynchronous with respect to the P mode UI. In the figure this asynchronicity is represented via dashed lines.

The formatting subroutine converts the data structure into a format readable by a present sponsored media module of the P mode UI. As illustrated, the subroutine passes SM_Format to the present SM module of the UI. Preferably the CE module formats a data structure SM_Struc into a format suitable nor the present module via an embedded routine, e.g. an embedded extensible stylesheet language (XSL) routine. In some embodiments the embedded XSL routine is an XSL transformations XSLT routine, however some embodiments use other formatting techniques, e.g. XSL formatting objects, XML Path Language, or some other technique. Furthermore, in embodiments where the data structure passed from the SM repository is in non-XML format, some suitable formatting technique is used.

The present SM module of the P mode UI preferably seamlessly integrates the sponsored media into the presentation for the viewer. In some embodiments, including the illustrated embodiment, the present module receives a set of sponsored media from the SM repository via the CE module. Preferably the P module shows the viewer all of the pieces of sponsored media in the set, each as placed in the presentation by its author. As mentioned above, in some embodiments the pieces of media are displayed sequentially and in some of those embodiments the CE module processes the pieces of sponsored media sequentially and sends them to the P mode UI once processed.

Implementations

Embodiments of the present invention can be implemented in a variety of presentation types and associated media types. Some exemplary scenarios are discussed below, including blogging and video production. Other media types are also amenable to some embodiments of the present invention, for example audio production or still-image slideshows.

Blogging

A blog implementation of the present invention turns a potential problem for publishers—blog authors embedding or uploading copyrighted content into their blogs—into a solution to their monetization needs. By presenting an author with sponsored media to supplement their blogging, by permitting the author to choose which content is ultimately integrated into the blog, and by presenting the sponsored media (and in some embodiments related ads) to the blog's viewers, these embodiments enlist the blog author's help in ensuring ads match blog content. One such embodiment is illustrated in FIGS. 4 and 5.

Figure 4:
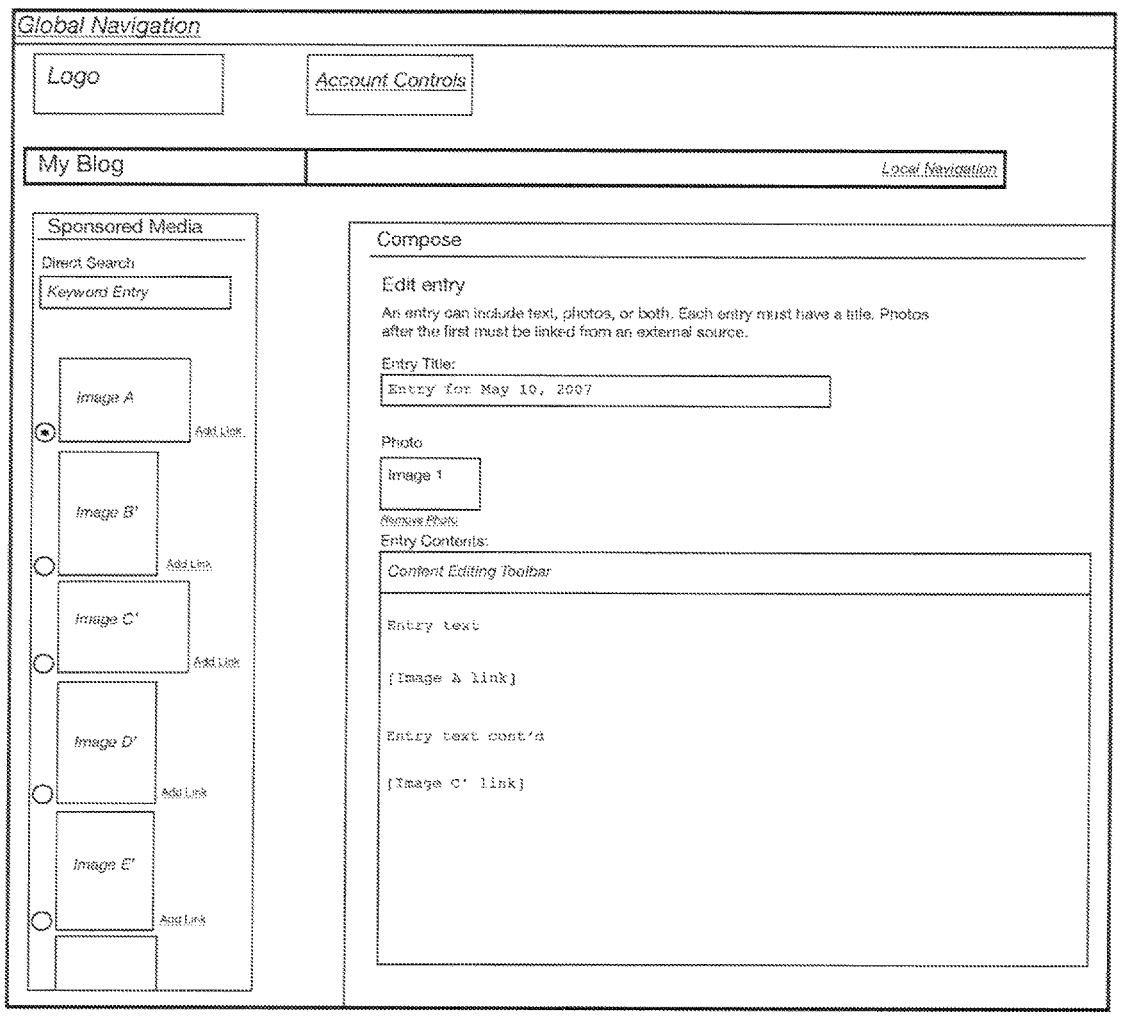
FIG. 4 illustrates an edit mode user interface of a computer-implemented blogging service consistent with some embodiments of the present invention.
Figure 5:
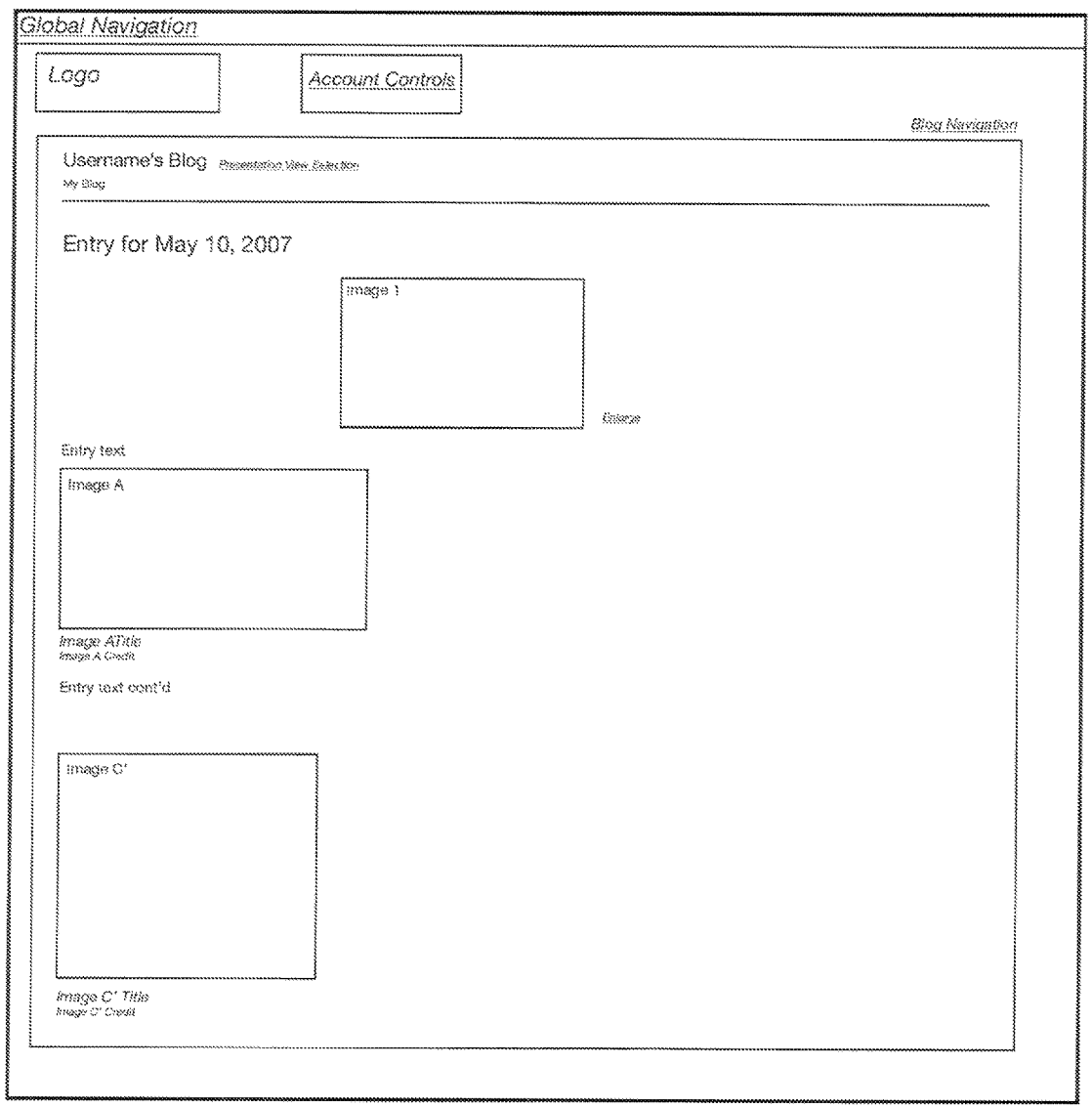
FIG. 5 illustrates a presentation mode user interface of a computer-implemented blogging service consistent with some embodiments of the present invention.

FIG. 4 illustrates the content generation mode of a web-based blogging tool. As illustrated the tool is a web page, which includes features typical to many account-based web pages such as *Global Navigation* links, a publisher Logo, and the author's *Account Controls*. The page further includes a blog title, My Blog, and *Local Navigation* links. The page also includes authoring tools.

The authoring tools in the page of FIG. 4 include the photo display module and the Compose module. The Compose module includes typical features, including instructions, a text box for the Entry Title, and a text-editing box for the Entry Contents. The Entry Contents box includes a Content Editing Toolbar and a space for the author to enter text and possibly HTML to compose the entry. Further, the Compose module includes a Photo upload section for the author to upload a photo. If a photo has been uploaded the Photo upload section includes a Remove Photo link.

The Sponsored Media display module performs several functions: displaying a selection of Sponsored Media and permitting an author to enter a query of keywords against a Sponsored Media (SM) repository in the Direct Search text entry box. Further the SM display module permits the author to add any displayed media, e.g. a photo as shown, to the Entry Contents box. The photos are displayed vertically below the Direct Search text-box that permits the author to search SM. By clicking an Add Link next to a photo, an author can add a link to the photo to the Entry Contents box.

The illustrated Photo module further includes radio buttons by which the author selects photos, for example to retain those photos when performing a search, to obtain more information on the photo, or for some other purpose. Preferably, the photos displayed in the photo display module are retrieved from the SM repository based on text entered by the author in Entry Contents. The photos can also be retrieved based on tags of the author's uploaded photo, or on text entered in the Search In the illustrated embodiment an author has typed "Entry text" in the Entry Contents box, clicked Add Link for Image A, and selected Image A, typed "Entry text cont'd" and clicked Add Link for Image C'. The author has also uploaded Image 1 via the Photo section of the Compose module. In addition, the author has titled the entry as "Entry for May 10, 2007".

An exemplary series of author actions to produce the illustrated entry is described below. First, the author enters the title, and then uploads Image 1 and types "Entry text". Preferably, as the author uploads Image 1 and types, a content match module retrieves photos, including Image A, from the SM repository and provides them to the photo display module, which displays the photos. When the author clicks Add Link for Image A, the "[Image A link]" text is automatically entered in the Entry Contents. Then the author selects Image A to retain it for viewing during composition as the other photos are updated. In some embodiments, clicking on the Add Link for an image selects that image automatically to save the author the trouble.

The author continues to compose the entry, typing "Entry text cont'd". The content match module retrieves additional photos from the SM repository based on this entry, updating the photo display module with Image B', Image C', Image D', and Image E'. Then the author clicks Add Link for Image C', which enters "[Image C' link]" in Entry Contents. At this point the author concludes the entry. In some embodiments the author is prompted to enter titles for Image A and Image C', however, in the illustrated embodiment titles are provided from the SM repository.

FIG. 5 illustrates the presentation mode of a web-based blogging tool. As illustrated the tool is a web page, which, like the content generation mode, includes many features typical to many account-based web pages such as *Global Navigation* links, a publisher Logo, and the viewer's *Account Controls*. In some cases the viewer won't have an account. The page further includes a blog section, which includes *Blog Navigation* links, and a blog masthead. The masthead includes a blog identifier, a blog title and a view selector. In the illustrated embodiment the bloc identifier is "Username's Blog", the title is My Blog, and the view selector is *Presentation View Selection* links. Below the masthead is the entry display section.

The entry display section includes a title section, an Uploaded Photo section and an entry contents section. Here the entry composed in FIG. 4 is shown. The blog entry is titled "Entry for May 10, 2007", and the Uploaded Photo section displays Image 1. The Photo section further includes an Enlarge link.

The contents of the Entry include two text sections, a first that reads "Entry text" and a second that reads, "Entry text cont'd". The entry further includes two linked photos. The first displays Image A, below which are listed Image a Title and Image A Credit. The second displays Image C', below which are listed Image C' Title and Image C' Credit.

Preferably rendering of the page proceeds as follows. First, a template for the page is retrieved. Then, specifics are retrieved and placed into a page based on the template. For example, the blog masthead information is placed based on a masthead placeholder and Image 1 and Entry Contents are placed based on an uploaded photo and an entry placeholder.

At this point a content extraction module finds sponsored media identifiers within Entry Contents and performs a query using those identifiers, e.g. as shown in FIG. 3. The resulting sponsored media, along with any additional data required by the identifiers, is placed based on the identifiers. Here, Image A, Image A Title, and Image A Credit are retrieved from the SM repository. Similarly, Image C', Image C' Title, and Image C' Credit are retrieved from the SM repository. Preferably, retrieval and formatting of the sponsored media takes place asynchronously is the rest of the page is loading. The CE module formats these data and places them within the entry based on the positions of "[Image A link]" and "[Image C, link]" within Entry Contents.

Thus, the page is rendered as shown in FIG. 5. When a viewer visits the blog, he or she can click on any of the sponsored media objects, e.g. photos, to visit the website of the SM provider.

Video

A video-editing implementation of the present invention turns a potential problem for publishers—users uploading copyrighted content—into a solution to their monetization needs. By presenting an author with sponsored media to supplement their video, by permitting the author to choose which content is ultimately integrated into their video, and by presenting the sponsored media (and in some embodiments related ads) to the video's viewers, these embodiments enlist the video author's help in ensuring ads match content. One such embodiment is illustrated in FIGS. 6 and 7.

Figure 6:
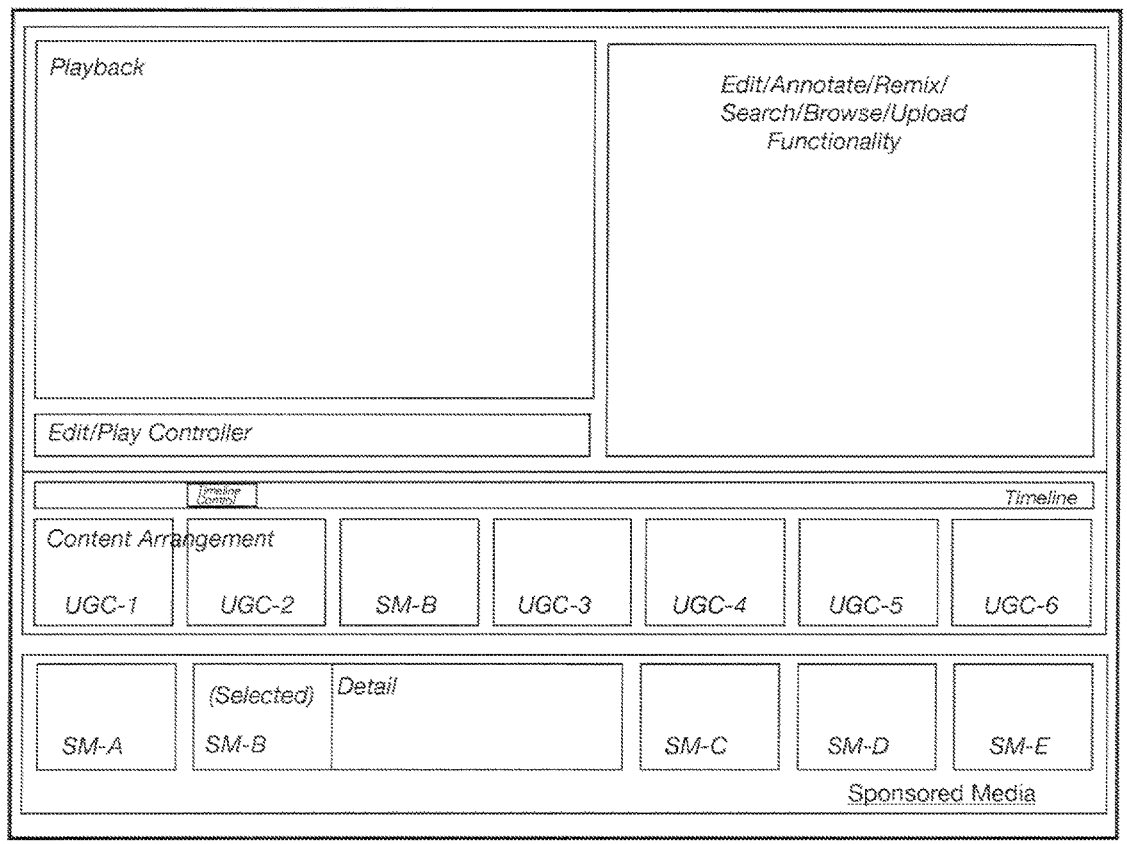
FIG. 6 illustrates an edit mode user interface of a computer-implemented video editing service consistent with some embodiments of the present invention.
Figure 7:
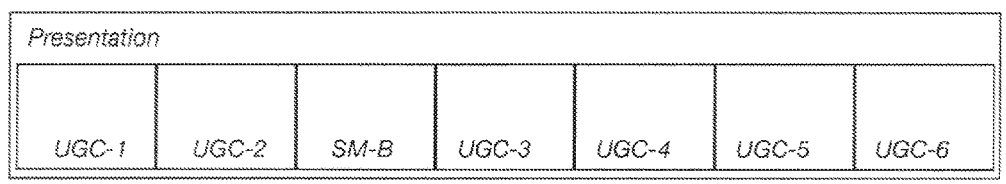
FIG. 7 illustrates a presentation mode user interface of a computer-implemented video editing service consistent with some embodiments of the present invention.

FIG. 6 shows a user interface of an online video-editor. The UI includes a Playback panel, a Functionality selection panel, a Controller, a Timeline and slider, a Content Arrangement panel and a Sponsored Media (SM) panel. For clarity the user of this editor is referred to as "author". The Sponsored Media panel is preferably labeled as illustrated.

The Functionality selection panel permits the author to select among editing, remixing, annotation, browsing and searching functions. For example, a Browse functionality allows an author to browse all content on the service, the user's own UGC only, or content that fits some browsable category. Similarly, the Search functionality might operate over all content, the author's content, only professionally produced content, only sponsored media, or some other subset of all content. All viewed content can be imported into the composition, preferably by dragging into the Content Arrangement panel. In addition, annotation and editing functionalities operate on the current composition or clip. An Upload functionality permits an author to upload a clip to the editor. Preferably, after an author initiates an upload event, the UI prompts the author to enter tags descriptive of the uploading clip. Annotate functionality permits the author to add tags or other information about to a clip. Preferably the Annotate functionality operates on all clips within the current composition, including sponsored media clips and those of other users. However, the tags and information preferably remain local to the composition and don't affect the original of the tagged or annotated clip.

The Controller is contextually switched based on the selected functionality, for example between editing controls and playback controls. The Timeline and its slider, Timeline Control, provide an overview of the composition and permit additional control.

The Content Arrangement panel permits the user to view, select and arrange content within the current composition. Preferably, content dragged and dropped from other panels onto the Content Arrangement panel is imported into the current composition.

The Sponsored Media panel displays sponsored media, permits a user to select a piece of sponsored media and to view additional detail information related to that piece of sponsored media. Further, the panel permits the user to drag sponsored media into the Content Arrangement panel, thereby importing the media into the current composition.

In the illustrated embodiment an author has imported user-generated content clips UGC-1, UGC-2, UGC-3, UGC-4, UGC-5, and UGC-6. Further, the tags and information associated with UGC-1, UGC-2, UGC-3, UGC-4, UGC-5 and UGC-6 have prompted a content match module of the UI to retrieve a set of sponsored media for display in the Sponsored Media panel.

The retrieved sponsored media includes SM-A, SM-B, SM-C, SM-D, and SM-E. The user has selected SM-B and thus the Sponsored Media panel displays a Detail section adjacent to SM-B. Further, the user has imported SM-B into the current composition, thus SM-B is displayed in the Content Arrangement panel. The user has placed SM-B between UGC-2 and UGC-3. Thus, the chronology of the Current composition as displayed on the timeline and in the content arrangement panel is UGC-1, UGC-2, SM-B, UGC-3, UGC-4, UGC-5, and UGC-6.

An exemplary series of author actions to produce the illustrated situation is described below. First, the author enters the browse mode, then finds UGC-1, UGC-2, UGC-3 and drags these into the Content Arrangement panel. At this point the CM module retrieves clips from the sponsored media (SM) repository based on tags and information associated with UGC-1, UGC-2, and UGC-3, and passes the SM clips to the UI, where they are displayed in the Sponsored Media panel. But the author doesn't select any of the media.

Then the author searches for UGC and finds UGC-4 and UGC-5. At this point the CM module retrieves clips from the sponsored media (SM) repository based on tags and information associated with UGC-4, and UGC-5, the search query entered by the author, and in some embodiments the tags and information associated with UGC-1, UGC-2, and UGC-3, and passes the SM clips to the UI, where they are displayed in the Sponsored Media panel. But the author doesn't select any of the media.

Then the author uploads UGC-6, and during the upload tags the clip with several words. At this point the CM module retrieves clips from the sponsored media (SM) repository based on the words with which the author tags UGC-6, in some embodiments the tags, and information associated with UGC-4, and UGC-5, the search query entered by the author, and in some embodiments the tags and information associated with UGC-1, UGC-2, and UGC-3, and passes the SM clips to the UI, where they are displayed in the Sponsored Media panel. These are the clips SM-A, SM-B, SM-C, SM-D, and SM-E, displayed in FIG. 6. Then the author selects SM-B, views Detail, and decides to drag SM-B into the Content Arrangement panel. The author places SM-B between UGC-2 and UGC-3.

If at this point the author finishes the composition, the editing session produces a presentation with a timeline as illustrated in FIG. 7. The presentation is preferably stored as a data structure that includes UGC-1, UGC-2, UGC-3, UGC-4, UGC-5, and UGC-6 as well as an identifier for SM-B placed between UGC-2 and UGC-3.

When a viewer selects the composition for viewing, for example as part of the viewer's own editing session, or in a stand-alone video viewer or viewing page, a content extraction module finds the SM-B identifier per forms a query using the identifier, e.g. as shown in FIG. 3. The resulting sponsored media, along with any additional data required by the identifier, is placed based on the identifiers. Here, SM-B is retrieved from the SM repository. Preferably, retrieval and formatting of the sponsored media takes place asynchronously as the rest of the video is playing or downloading. Thus UGC-1 and UGC-2 play or are downloaded while SM-B is retrieved and formatted. Then SM-B is played or downloaded, and then UGC-3, UGC-4, UGC-5, and UGC-6 play or are downloaded.

Thus, the video is rendered as shown in FIG. 7. In some embodiments, ads are displayed alongside the video in a player. Preferably, these ads are related to the sponsored media displayed in the video.

Advantages

The embodiments described herein are advantageous in several use scenarios. For example, after shooting some family video on vacation a user wants to share experiences with friends and family. The user's experience included several events over a geographic area, including a copyrighted show and a panoramic view from an overlook. The user's footage is lacking any good panoramic footage from the overlook, as the camera used lacked a wide-angle lens. Further, the user's footage contains no aerial views, though they would help convey a sense of the area covered. Finally, since cameras weren't allowed in the show, the user has no footage of the experience.

With the video embodiment described above, the user uploads home footage and then is presented with (or searches for) appropriate video based on tags and descriptions entered.

In general, embodiments of the invention provide new opportunities to monetize user-generated content through the provision of high-quality, professional, sponsored media for integration into user's presentations. Users are given the advantage of high quality media for use in their presentations, while publishers achieve human intelligence level content matching of advertisements and sponsorship with otherwise hard-to-match media. Furthermore, the provision of 'free'-to-use sponsored media reduces user incentive to upload or otherwise integrate copyrighted material without permission.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

The invention claimed is:

1. A system for content matching user generated content with advertisements, the system comprising:
   a sponsored media repository configured to store a plurality of sponsored media provided by an advertiser, at least some respective sponsored media of the plurality of sponsored media having respective related advertisements;
   a content matching module configured to receive a set of keywords specified by a user of a content generation apparatus, identify sponsored media within the sponsored media repository relevant to the keywords, and return unique identifiers corresponding to the sponsored media relevant to the set of keywords to the content generation apparatus; and
   a content extraction module configured to receive a unique identifier from a presentation apparatus and identify a sponsored media within the sponsored media repository corresponding to the unique identifier and return a sponsored media to the presentation apparatus for integration with user generated content and a related advertisement, the content extraction module further configured to format the sponsored media corresponding to the unique identifier to a format readable by the presentation apparatus for integration with user generated content;
an advertisement selection module configured to select an advertisement for display with the user generated content based on a content match between the identified sponsored media and the selected advertisement; and
a computer to implement the presentation apparatus to present content to viewers, the content including the user generated content, the formatted sponsored media and the selected advertisement.

2. The system of claim 1 wherein the content matching module is further configured to format the sponsored media to a format readable by the content generation apparatus and provide the formatted sponsored media to the content generation apparatus.

3. The system of claim 1 wherein the content extraction module is further configured to retrieve the sponsored media corresponding to the unique identifier and to format the sponsored media corresponding to the unique identifier asynchronously as the presentation apparatus presents the content to viewers.

4. The system of claim 1 wherein the presentation apparatus is configured to display user generated content in combination with the sponsored media.

5. The system of claim 4 wherein the presentation apparatus is further configured to display an advertisement related to the user generated content based on the selected sponsored media.

6. A method for content matching user-generated content with advertisements, the method comprising:
receiving a set of keywords from a content creator;
identifying a plurality of sponsored media within a sponsored media repository, each sponsored media provided by an advertiser and having related advertisements, the identified plurality of sponsored media being relevant to the set of keywords;
returning a plurality of unique identifiers to the content creator, each of the plurality of unique identifiers identifying a sponsored media within the sponsored media repository;
receiving a unique identifier from a content presenter, the unique identifier being a unique identifier from among the plurality of unique identifiers provided to the content creator;
identifying a sponsored media within the sponsored media repository corresponding to the unique identifier;
formatting the identified sponsored media corresponding to the unique identifier to a format readable by the content presenter for integration with user-generated content;
returning the identified sponsored media corresponding to the received unique identifier to the content presenter;
selecting an advertisement related to the identified sponsored media for display at the content presenter, the advertisement being content-matched with the user generated content based on the selected sponsored media; and
presenting on the content presenter for viewing by a user the user-generated content together with the formatted sponsored media and the selected advertisement.

7. The method of claim 6 further comprising:
formatting each of the plurality of sponsored media into a format readable by the content creator; and
returning a plurality of formatted sponsored media to the content creator.

8. The method of claim 6 further comprising:
retrieving the identified sponsored media and formatting the identified sponsored media asynchronously as the content presenter presents the user-generated content to the user.

9. The method of claim 6 further comprising displaying the identified sponsored media, the related advertisement, and user generated content.

10. The method of claim 9 further comprising displaying the selected advertisement based on the identified sponsored media.

11. The method of claim 9 wherein the identified sponsored media is a video and the user generated content is a video, wherein the sponsored media and the user generated content is displayed in a media player as a single video without interruption.

12. The method of claim 10 wherein the advertisement is displayed alongside the sponsored media.

13. A non-transitory computer-readable storage medium comprising computer-executable instructions that, when executed by a computer having a processor and memory, provides content matching of user generated content with advertisements by:
receiving a set of keywords from a content creator;
identifying a plurality of sponsored media within a sponsored media repository, each sponsored media provided by an advertiser and having related advertisements, the identified plurality of sponsored media being relevant to the set of keywords;
returning a plurality of unique identifiers to the content creator, each of the plurality of unique identifiers identifying a sponsored media within the sponsored media repository;
receiving a unique identifier from a content presenter, the unique identifier being a unique identifier from among the plurality of unique identifiers provided to the content creator;
identifying a sponsored media within the sponsored media repository corresponding to the unique identifier;
formatting the identified sponsored media corresponding to the unique identifier to a format readable by the content presenter for integration with user-generated content;
returning the identified sponsored media corresponding to the received unique identifier to the content presenter;
selecting an advertisement related to the identified sponsored media for display at the content presenter, the advertisement being content-matched with the user generated content based on the selected sponsored media; and
presenting on the content presenter for viewing by a user the user-generated content together with the formatted sponsored media and the selected advertisement.

14. The non-transitory computer-readable storage medium of claim 13 wherein the computer-executable instructions further provide sponsored media by:
formatting each of the plurality of sponsored media into a format readable by the content creator; and
returning a plurality of formatted sponsored media to the content creator.

15. The non-transitory computer-readable storage medium of claim 13 wherein the computer-executable instructions further provide sponsored media by:
retrieving the identified sponsored media and formatting the identified sponsored media asynchronously as the content presenter presents the user-generated content to the user.

16. The non-transitory computer-readable storage medium of claim 13 wherein the computer-executable instructions further provide sponsored media by:
displaying the identified sponsored media, the related advertisement, and user generated content.

17. The non-transitory computer-readable storage medium of claim 13 wherein the computer-executable instructions further provide sponsored media by:
displaying the selected advertisement based on the selected sponsored media.

18. The non-transitory computer-readable storage medium of claim 16 wherein the sponsored media is a video and the user generated content is a video, wherein the sponsored media and the user generated content is displayed in a media player as a single video without interruption.

19. The non-transitory computer-readable storage medium of claim 16 wherein the advertisement is displayed alongside the sponsored media.

* * * * *